Figure 1:
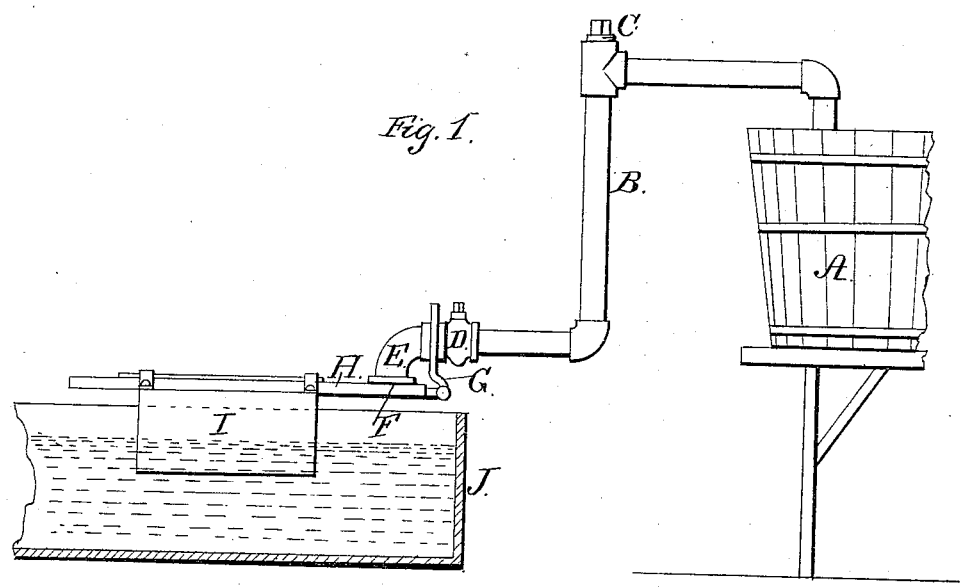

(No Model.)

J. H. GILBERT.
DEVICE FOR WATERING STOCK.

No. 313,317. Patented Mar. 3, 1885.

Attest:
T. F. Schneider
H. C. Huntemann

Inventor:
J. H. Gilbert
by F. B. Brock
Att'y

UNITED STATES PATENT OFFICE.

JABUZ HICKMAN GILBERT, OF BIG SANDY, TENNESSEE.

DEVICE FOR WATERING STOCK.

SPECIFICATION forming part of Letters Patent No. 313,317, dated March 3, 1885.

Application filed September 15, 1884. (No model.)

*To all whom it may concern:*

Be it known that I, JABUZ HICKMAN GILBERT, a citizen of the United States, residing at Big Sandy, in the county of Benton and State of Tennessee, have invented certain new and useful Improvements in Devices for Watering Stock; and I do hereby declare the following to be a full, clear, and exact description of the invention, such as will enable others skilled in the art to which it appertains to make and use the same.

My present invention relates to devices for watering stock of all kinds.

The object of my improvement consists in the drawing of water from a source of supply by means of siphonage, and providing an automatic outlet into the trough or drinking-vessel by means of which a substantially uniform level may be kept within the trough, no matter how fast or slow the water may be used therefrom.

To effect this object my invention consists in certain details of construction, the precise nature of which will first be fully described, and then pointed out in the claim.

Figure 2:
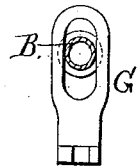

Figure 1 represents, in elevation, a device for watering stock to which I have applied my improvements. Fig. 2 represents a detail view of the adjustable bracket.

A represents the source of supply. The supply may consist in a natural or artificial body for containing water, and the siphon-pipe B may be a surface or an underground one extending over any practicable distance.

C represents a tap in the pipe for the purpose of charging the siphon, or for any other purpose.

D is a set-valve for gaging the amount of delivery through the siphon. It may be a check-valve arranged to open into the trough, but seating itself against the tendency, if any, of back suction under certain circumstances.

E is an elbow-outlet, having a hinged valve, F, arranged to automatically regulate the flow of water through the siphon.

G is a bracket, having a central perforation in its upper end to receive the nipple connecting valve D and elbow E, so that it may be clamped firmly between them.

H is a horizontally-arranged lever-arm carrying the valve-seat which closes and opens the discharge end of the siphon. One end is hinged to the lower end of bracket G, and the other is adjustably connected to a float, I, which latter rests upon the surface of the water in the drinking-trough J. The arrangement is such that when the water is at the desired level in the trough J the buoyancy of the float will cause the valve-seat on arm H to press against the siphon discharge-pipe and stop the flow. When, however, from the drinking of the cattle or other cause, the water falls below the desired level, the float falls also, and allows a flow of water in direct proportion to the amount withdrawn from the normal level of the trough.

In order to provide for the proper adjustment of the valve against the discharge end of the pipe, the perforation in the upper end of the bracket G is made in an elongated form, as shown in detail, Fig. 2. The correct vertical position of bracket G is first ascertained, when it is securely clamped between the elbow E and valve D, or between equivalent adjustable shoulders on the siphon-pipe.

By means of my improved method of adjusting the bracket-arm G vertically I am enabled to use different thicknesses of valve-seats, and also to so adjust the valve as to compensate for the wear of the seat. Moreover, should the float-arm H become damaged by the stock or other cause, it is capable of being replaced by a substitute of unequal thickness, the adjustable bracket G admitting of such use.

Having described my invention, what I claim as new, and desire to secure by Letters Patent of the United States, is—

In a device for watering stock, a siphon-pipe, a bracket located thereon having an elongated opening or adjusting-slot, as described, with means for clamping the same to the siphon, and an automatically-operating float-valve hinged to the bracket, the whole arranged to act in combination, substantially as set forth.

In testimony whereof I affix my signature in presence of two witnesses.

JABUZ HICKMAN GILBERT.

Witnesses:
BRUCE COVETT,
HENRY MCNEILL.